(No Model.)
F. SCHLEY.
SAFETY HOOK.
No. 400,365. Patented Mar. 26, 1889.
Fig. 1.     Fig. 2.
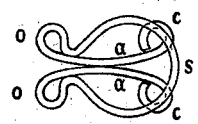 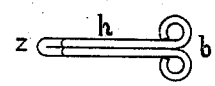
Fig. 3. 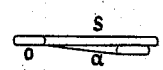 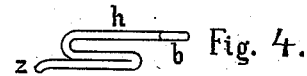 Fig. 4.
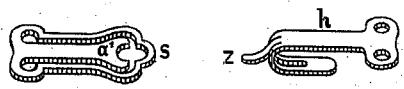 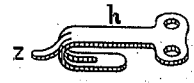
Fig. 5.     Fig. 6.
Witnesses.
Alban Horn.
Johannes Horn.
Inventor:
Fritz Schley
by Erasmus Paul, attorney.
N. PETERS. Photo-Lithographer, Washington, D. C.

UNITED STATES PATENT OFFICE.

FRITZ SCHLEY, OF BERLIN, GERMANY, ASSIGNOR OF ONE-HALF TO PAUL BOUVERON, OF SAME PLACE.

SAFETY-HOOK.

SPECIFICATION forming part of Letters Patent No. 400,365, dated March 26, 1889.

Application filed August 22, 1888. Serial No. 283,427. (No model.) Patented in Germany October 11, 1887, No. 43,220.

*To all whom it may concern:*

Be it known that I, FRITZ SCHLEY, a subject of the King of Prussia, residing at Berlin, Prussia, German Empire, have invented certain new and useful Improvements in Safety-Hooks, fully described and represented in the following specification and the accompanying drawings, forming a part of the same.

The present invention has for its object an improved safety-hook, which is especially applicable for wearing-apparel, sheets, curtains, seat-cloths, marquees, and other similar objects. This hook consists, as usual, of two parts—namely, a hook proper and a loop, eye, or hook-holder. All the hooks hitherto invented have the disadvantage of allowing the parts connected thereby to become too frequently and easily disconnected and at unexpected times, which is inconvenient in the case of garments. The prevention of this disadvantage is the object of this invention. The improved hook possesses this peculiarity, that its organs can only be loosened by exerting a comparatively great effort, while they can be connected without any difficulty. For this purpose the hook is provided with a blade or tongue-piece, and the loop with two elastic branches or an elastic small plate, the latter (branches and plate) being so arranged as to exert a certain pressure on the said tongue-piece, which rests against their under sides when the hook has entered into the cramp, and will only yield under a pressure in the opposite direction.

The invention is best understood by referring to the annexed drawings, the six figures of which show a hook made in accordance with this invention. It is understood that the right is reserved of modifying the shape and size thereof.

In these figures, $s$ is the loop, and $b$ the hook which engages therewith. As seen in Figures 1 to 4, the loop is formed with two branches, $a\ a$, which possess a springing action. On the other hand the hook terminates in a blade or tongue-piece, $z$. When the hook has entered into the loop, the tongue $z$ bears against the under part of the said branches. Owing to their elasticity, the latter have a tendency to retain the tongue; and it is only by exerting a pretty strong pressure on the rear part, $b$, of the hook that the tongue-piece can be induced to pass between the branches $a\ a$ and so free the hook. For the purpose of giving the loops $s$ a firmer hold on the parts to be secured, they can be sewed, not only at the eyes $o\ o$, but also at the parts $c\ c$; but care must be taken that in so doing the springing action of the branches $a\ a$ is not interfered with.

Hooks and loops can be made of bent wire, sheet metal, or metal strips. When the hooks are made of sheet metal or metal strips, it is advisable to punch the tongue-piece $z$, so as to form it to the required shape, as shown by Fig. 5. In the case of loops made of metal sheet or strips (see Fig. 6) the springing cheeks are best united together so as to form a small plate, $a'$, which is caused by the pressure of the tongue-piece $z$ to spring in the direction of the pressure each time the fastening device is closed or loosened.

Having now particularly described and ascertained the nature of the said invention and in what manner the same is to be performed, I declare that what I claim is—

1. A hook forming the one element of a safety-hook connection, and having a blade or tongue-piece, $z$, as described, and for the purpose stated.

2. The combination of a hook having the blade or tongue-piece $z$ with a loop having thereon the elastic small plate $a'$, as described, and for the purpose stated.

In testimony whereof I have signed my name to this specification in the presence of two subscribing witnesses.

FRITZ SCHLEY.

Witnesses:
B. ROI,
F. VON VERREN.